3,161,723
SPREADER FOR BUNDLED ELECTRIC
CONDUCTORS
Archibald T. Flower, Glenside, Pa. (Queen St. and Ivy
Hill Road, Philadelphia, Pa.), and John I. MacPherson,
711 Hartranft St., Fort Washington, Pa.
Filed May 9, 1963, Ser. No. 279,090
4 Claims. (Cl. 174—146)

This invention relates to a spreader for bundled electric conductors.

It is an object of the invention to provide a spreader which will hold the conductors, in spaced apart relation, with the conductors disposed in the same horizontal plane and one of the conductors, which acts as a messenger raised above the plane of the other conductors to facilitate the connection of service lines to the conductors.

A further object of the invention resides in providing a spreader composed of identical plates formed of suitable insulation material, each plate having spaced notches formed in one edge and a hook shaped member formed along the opposite edge, the said plates being pivotally connected together at the center with the notches of said plates in register and the hooks of the plates extending in opposite directions with their ends in overlapping relation and forming an aperture for reception of one of the conductors.

A still further object of the invention resides in providing a pair of parallel plates pivotally connected together, at the center, each plate having a hook formed along one edge, the hook of one plate being opposed to the hook of the other plate with the ends of the hooks in overlapping relation to form an opening to receive one of the conductors, and alined apertures through said plates adapted to receive a bail wire for attaching a service wire and hold the plates from rotating.

Other objects and advantages of the invention will be apparent during the course of the following description.

Figure 1:
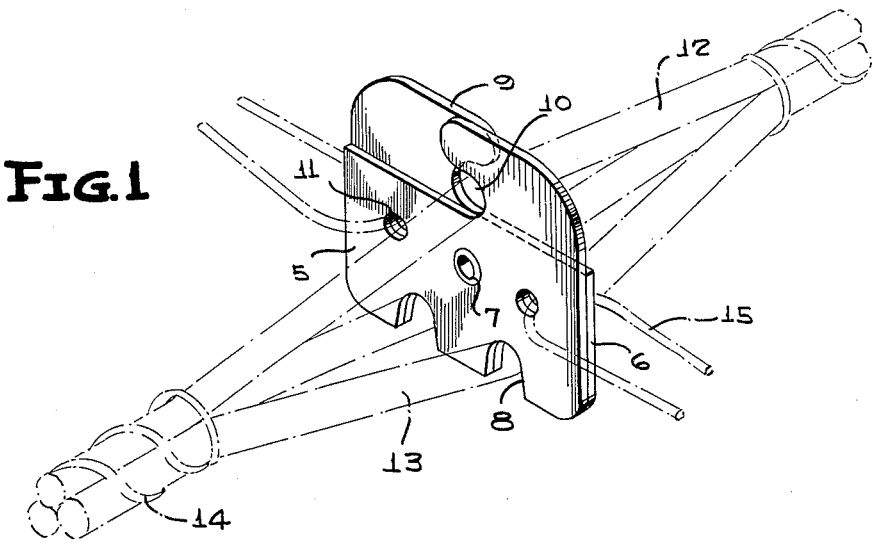
Figure 2:
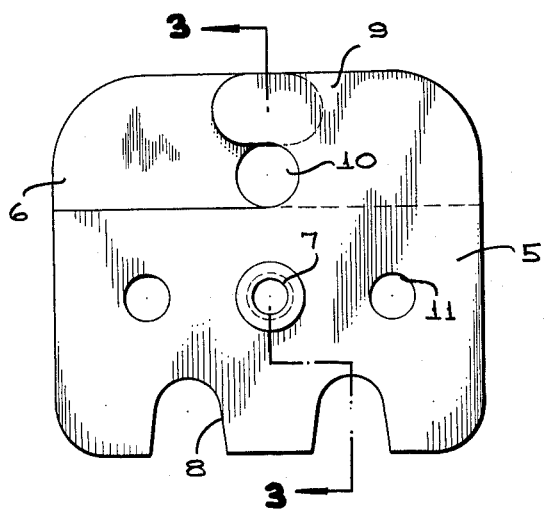
Figure 3:
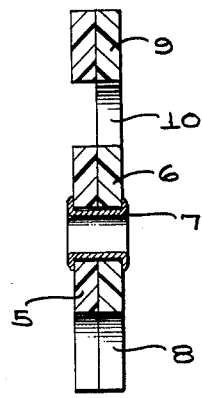

In the accompanying drawing, forming a part of this specification and in which like numerals are employed to designate like parts throughout the same, FIG. 1 is a perspective view of the spreader in operative position, FIG. 2 is a side view of the spreader, and, FIG. 3 is a cross section taken on line 3—3 of FIG. 2.

In the drawing, a pair of plates 5 and 6, of substantially square shape, are disposed in parallel abutting relation and are pivotally connected together by a grommet 7. The plates are constructed of suitable insulation material such as glass fiber reinforced polyester. The lower edge of both plates is provided with spaced apart notches 8, with the notches of one plate in register with the notches of the other plate. The upper edge of each plate has a hook shaped member 9 extending longitudinally of the edge, with the hook member of plate 5 extending in a direction opposite to that of the hook member of plate 6 and having the ends of the hooks disposed in parallel overlapping relation to define an opening 10 midway the length of the upper edge. The plates adjacent each of the side edges of the plates are provided with registering apertures 11. The opening 10 is adapted to receive the top conductor or messenger 12 while the notches 8 receive the conductors 13 of the bundled wires 14. A bail 15 is inserted through the apertures 11 for supporting a service line and to hold the plates against rotation.

In use, the bundled wires 14 are spread apart and the plates 5 and 6 are rotated in opposite directions to separate the ends of the hooks 9 to allow the conductor 12 to be inserted in the opening 10. After insertion of the conductor the plates are rotated to move the ends of the hooks into overlapping relation to retain the conductor in the opening 10 and when the hooks are in overlapping relation the notches 8 in the lower edges of the plates are in alinement to receive the conductors 13. After the conductors are seated in the opening 10 and notches 8, the bail 15 for supporting the service wire is inserted through the apertures 11 thereby holding the plates against rotation.

It is to be understood that the invention herein shown and described is a preferred example of the same and changes in the shape, size and arrangement of the parts may be made without departing from the spirit of the invention or scope of the subjoined claims.

Having thus described our invention, we claim:

1. A spreader for bundled electric conductors comprising a pair of plates disposed in parallel abutting relation, pivot means disposed medially of said plates rotatably connecting said plates together, each of said plates having a like plurality of spaced apart upwardly extending notches in the lower edge thereof, and hook members extending longitudinally of the upper edges of said plates in opposite directions, with the end of the hook of one plate overlapping the end of the hook of the other plate to define an opening to receive a conductor, and with the notches of one plate registering with the notches of the other plate to receive the other conductors.

2. A spreader for bundled electric conductors comprising a pair of plates disposed in parallel abutting relation, pivot means disposed medially of said plates rotatably connecting said plates together, hook members extending longitudinally of the upper edges of said plates in opposite directions, with the end of the hook of one plate overlapping the end of the hook of the other plate to define an opening for surrounding a conductor, the ends of said hooks being separable upon rotation of said plates in opposite directions for insertion of a conductor in said opening, each of said plates having a like plurality of spaced apart upwardly extending notches in the lower edges thereof, with the notches of one plate registering with respective notches of the other plate when the ends of said hooks are disposed in overlapped position, whereby to receive a conductor in a registering pair of notches.

3. The invention of claim 2 in which both plates are of identical construction.

4. A spreader for bundled electric conductors comprising a pair of plates, means rotatably connecting said plates together in parallel abutting relation, the lower edge of each plate having spaced apart upwardly extending notches, with the notches of one plate adapted to register with the notches of the other plate, a hook member formed on the upper edge of each plate at opposite ends of said plates, the bills of said hooks extending in parallel relation to the upper edge of said plates with their free ends disposed in overlapping relation to define an opening to receive a conductor, and means extending through registering openings formed in said plates to hold said plates against rotation.

References Cited by the Examiner

UNITED STATES PATENTS

| 310,938 | 1/85 | Gilliland | 248—61 |
| 1,455,330 | 5/23 | Fordyce. | |
| 2,560,723 | 7/51 | Hansen. | |
| 2,887,524 | 5/59 | Fulps | 174—43 |
| 2,921,112 | 1/60 | Dykstra et al. | 174—43 |
| 3,066,182 | 11/62 | Flower | 174—146 |

JOHN F. BURNS, *Primary Examiner.*

JOHN P. WILDMAN, *Examiner.*